F. MESINGER.
SPEED VARYING AND REVERSING MECHANISM.
APPLICATION FILED JULY 22, 1910.
972,391.
Patented Oct. 11, 1910.
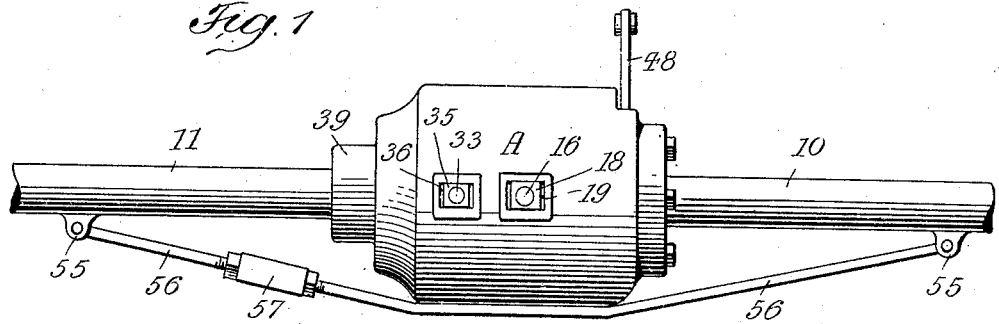
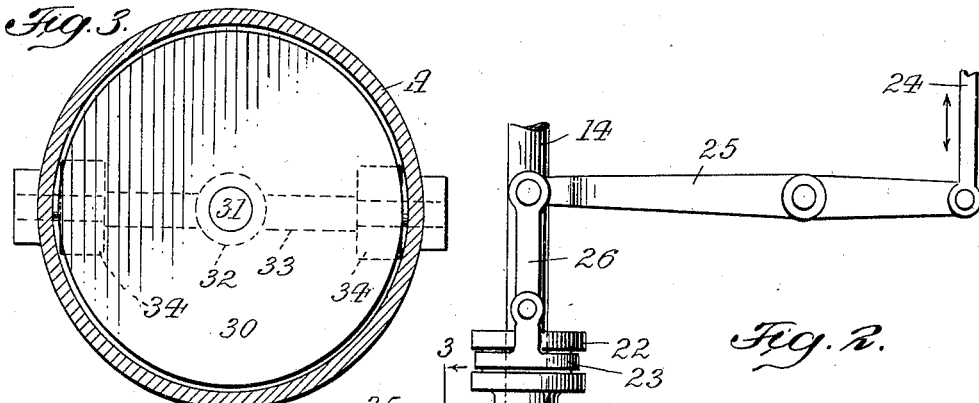
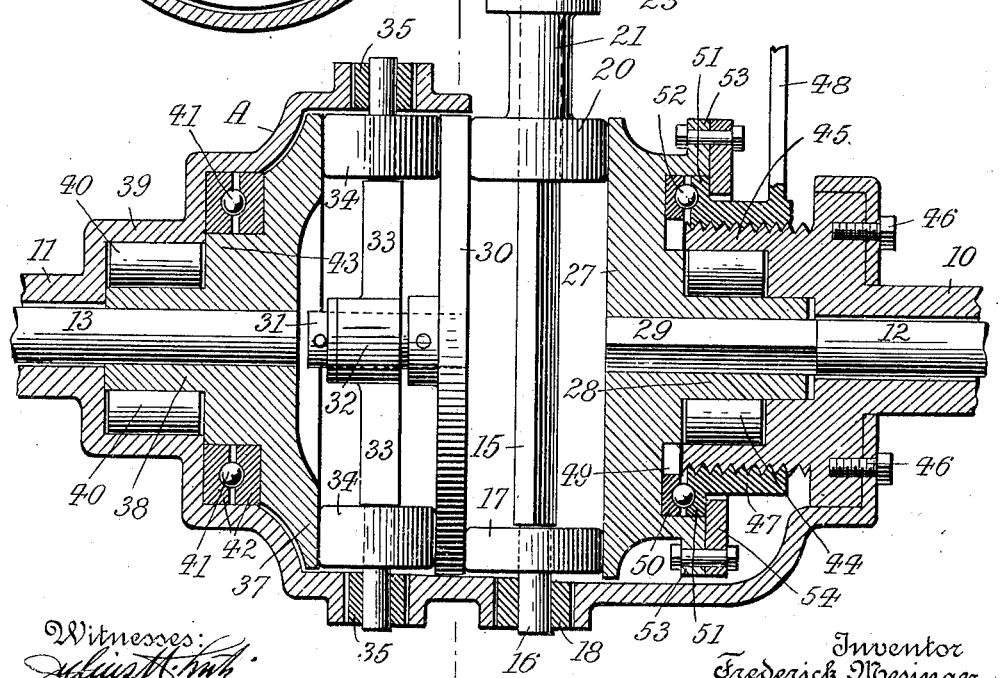
Witnesses:
Inventor
Frederick Mesinger,
By his Attorneys

UNITED STATES PATENT OFFICE.

FREDERICK MESINGER, OF NEW YORK, N. Y.

SPEED VARYING AND REVERSING MECHANISM.

972,391. Specification of Letters Patent. Patented Oct. 11, 1910.

Application filed July 22, 1910. Serial No. 573,182.

*To all whom it may concern:*

Be it known that I, FREDERICK MESINGER, a citizen of the United States, residing at New York city, county and State of New York, have invented new and useful Improvements in Speed Varying and Reversing Mechanism, of which the following is a specification.

This invention relates to a speed varying and reversing mechanism of novel construction, more particularly designed for automobiles.

The device is so constructed that it may be readily manipulated, that breakage is not liable to occur, and that the loss of power by friction is reduced to a minimum.

In the accompanying drawing: Figure 1 is a rear view of an automobile-driving axle provided with my improved speed varying and reversing mechanism; Fig. 2 a longitudinal section of the mechanism proper, and Fig. 3 a cross section on line 3—3, Fig. 2.

From a suitable casing A that incloses the speed gearing proper extend laterally a pair of axially alined tubular sleeves 10, 11 loosely embracing the right and left driving axles 12, 13 respectively of an automobile or similar vehicle. These axles are adapted to be coupled to a suitably driven power shaft 14, the squared section 15 of which extends transversely through casing A. At its free end, shaft 14 is provided with a stud 16 which carries a loose friction disk 17 and is journaled in a bearing 18 slidably mounted within a corresponding oblong opening 19 of casing A. Upon squared section 15 is slidably mounted a friction wheel 20, the outwardly extending hub 21 of which is provided with a grooved collar 22. The latter is engaged by a ring 23 that is connected to a shipping rod 24 by a lever 25 and links 26. Wheel 20 engages a friction disk 27 the hub 28 of which is reciprocally mounted upon the squared inner end 29 of driving axle 12. Opposite to disk 27, wheel 20 engages a transmission disk 30 secured to a mandrel 31 which is loosely mounted in the hub 32 of a traverse 33. The outer reduced ends of the latter carry friction wheels 34 and are mounted in slide blocks 35 fitted into corresponding oblong openings 36 of casing A. Wheels 34 engage a friction disk 37, the hub 38 of which is keyed or otherwise fastened to the inner end of driving axle 13. Hub 38 is rotatably mounted within the stepped section 39 of casing A by means of rollers 40 while anti-friction balls 41 take up the axial thrust of the disk produced in manner hereinafter described. Balls 41 are preferably located between a pair of grooved rings 42 encircling the stepped section 43 of disk 37.

Hub 28 of disk 27 is rotatably mounted by anti-friction rollers 44 within the cup-shaped inner end 45 of sleeve 10, which is secured to casing A by screws 46. At its periphery, cup 45 is threaded for engagement with a nut 47 having an arm 48 that extends outward through a corresponding opening of casing A. Into an outer annular recess 49 of disk 27 is fitted a grooved ring 50 which is opposed by a corresponding flange 51 of nut 47 while anti-friction balls 52 are interposed between said ring and flange. In order to take along disk 27 during the receding movement of nut 47, there is bolted to a flange 53 of the disk, an annulus 54 which engages flange 51 of nut 47. Sleeves 10, 11 are prevented from sagging by depending eyes 55, with which they are provided and that are engaged by a sectional brace 56. The latter supports casing A and may be tightened by a turn buckle 57.

If it is desired to start the car at low speed, friction wheel 20 is brought into the position shown in Fig. 2, while arm 48 is so set as to withdraw disk 27 from wheel 20, whereupon the motor is started to rotate shaft 14. Arm 48 is then so manipulated as to force disk 27 toward disk 37, disks 27, 30 being thus rotated in opposite directions. The movement of disk 30 is by wheels 34 reversedly transmitted to disk 37, so that both disks 27, 37 together with their driving axles revolve in the same direction and at the same speed. It will be seen, that the nearer wheel 20 is shifted toward the center of disk 30 the greater will be the speed of the vehicle, while, if wheel 20 is shifted beyond the center, the direction of the car is reversed. If it is desired to stop the car, arm 48 is so turned as to withdraw disk 27 from wheels 20, and thus relieve the parts of pressure, so that movement will no longer be transmitted from shaft 14 to the driving axles.

It will be seen that by the construction described, the speed and direction of a motor-driven vehicle may be readily controlled, and that the parts of the transmitting mechanism are not liable to be broken or become otherwise disarranged.

I claim:

1. In a speed varying and reversing mechanism, a power shaft, a friction wheel slidably mounted thereon, a first friction disk engaged by said wheel, a second friction disk, means for transmitting motion from the friction wheel to the second friction disk, means for varying the distance between the friction disks, and driving axles carrying said disks.

2. In a speed varying and reversing mechanism, a pair of driving shafts, friction disks carried thereby, a power-driven axially displaceable friction wheel engaging one of said disks, means for transmitting motion from the wheel to the other disk, and means for varying the friction between said wheel and disks.

3. In a speed varying and reversing mechanism, a pair of driving shafts, friction disks carried thereby, a power-driven friction wheel engaging one of the disks, means for axially displacing said wheel, means for transmitting motion from the wheel to the other disk, and means for varying the friction between said wheel and disks.

4. In a speed varying and reversing mechanism, a pair of driving shafts, friction disks carried thereby, a power-driven axially displaceable friction wheel engaging one of said disks, a transmission disk engaging said wheel, friction wheels intermediate the transmission disk and the other friction disk, and means for varying the distance between the friction disks.

5. In a speed varying and reversing mechanism, a casing, a threaded cup secured thereto, a pair of opposed friction disks inclosed within the casing, driving axles carrying the disks, a power shaft, a friction wheel slidable thereon and engaging one of the disks, means for transmitting motion from said wheel to the other disk, and a nut engaging the cup and adapted to control the distance between the disks.

6. In a speed varying and reversing mechanism, a casing, a pair of opposed friction disks inclosed within the casing, driving axles carrying the disks, a power shaft, a first friction wheel slidable thereon and engaging one of the disks, a transmission disk engaging said friction wheel, a pair of second friction wheels intermediate said transmission disk and the other friction disk, and means for controlling the distance between the friction disks.

7. In a speed varying and reversing mechanism, a casing, a pair of opposed friction disks inclosed within the casing, driving axles carrying the disks, a power shaft, a first friction wheel slidable thereon and engaging one of the disks, a traverse movably mounted in the casing, a pair of second friction wheels carried thereby that engage the other disk, a transmission disk intermediate the first and second friction wheels, and means for varying the distance between the friction disks.

8. In a speed varying and reversing mechanism, a casing, a pair of opposed friction disks inclosed within the casing, driving axles carrying the disks, a power shaft, a first friction wheel slidable thereon and engaging one of the disks, a traverse movably mounted in the casing, a pair of second friction wheels carried thereby that engage the other disk, a mandrel journaled in the traverse, a transmission disk intermediate the first and second friction wheels and carried by the mandrel, and means for varying the distance between the friction disks.

9. In a speed varying and reversing mechanism, a first driving axle, a first friction disk secured thereto, a second driving axle, a second friction disk slidably mounted on said second axle, a power shaft, a friction wheel slidably mounted thereon and engaging one of said disks, means for transmitting motion from the friction wheel to the other disk, and means for setting the second friction disk.

FREDERICK MESINGER.

Witnesses:
HENRY MESINGER,
JULIUS REICHELT.